(12) United States Patent
Rueda et al.

(10) Patent No.: US 11,448,059 B2
(45) Date of Patent: Sep. 20, 2022

(54) PRODUCTION LOGGING TOOL

(71) Applicant: Saudi Arabian Oil Company, Dhahran (SA)

(72) Inventors: Jose I. Rueda, Dhahran (SA); Almaz Sadykov, Dhahran (SA); Karim Mechkak, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 29 days.

(21) Appl. No.: 16/986,678

(22) Filed: Aug. 6, 2020

(65) Prior Publication Data

US 2022/0042392 A1    Feb. 10, 2022

(51) Int. Cl.
*E21B 47/10* (2012.01)
*E21B 33/10* (2006.01)
*E21B 49/08* (2006.01)

(52) U.S. Cl.
CPC .............. *E21B 47/10* (2013.01); *E21B 33/10* (2013.01); *E21B 49/08* (2013.01)

(58) Field of Classification Search
CPC ........... E21B 47/10; E21B 33/10; E21B 49/08
See application file for complete search history.

(56) References Cited

U.S. PATENT DOCUMENTS

| | | |
|---|---|---|
| 2,649,710 A | 8/1953 | Dale |
| 2,706,406 A | 4/1955 | Vincent et al. |
| 3,066,739 A | 12/1962 | Saurenman et al. |
| 3,176,511 A | 4/1965 | Widmyer |
| 3,789,217 A | 1/1974 | Youmans |
| 3,875,606 A | 4/1975 | Landers |
| 3,938,594 A | 2/1976 | Rhudy et al. |
| 4,137,182 A | 1/1979 | Golinkin |
| 4,389,461 A | 6/1983 | Scott |
| 4,452,076 A | 6/1984 | Gavignet et al. |
| 4,566,317 A * | 1/1986 | Shakra ............. E21B 47/10 73/152.35 |
| 4,800,752 A | 1/1989 | Piers |
| 4,928,758 A | 5/1990 | Siegfried, II |
| 5,007,481 A | 4/1991 | Williams et al. |

(Continued)

FOREIGN PATENT DOCUMENTS

WO    WO 2005080012    9/2005

OTHER PUBLICATIONS

Funkhouser and Norman, "Synthetic Polymer Fracturing Fluid for High-Temperature Application," International Symposium on Oilfield Chemistry, Society of Petroleum Engineers, SPE 80236, Feb. 5-7, 2003, 6 pages.

(Continued)

*Primary Examiner* — D. Andrews
(74) *Attorney, Agent, or Firm* — Fish & Richardson P.C.

(57) ABSTRACT

In an example implementation, a production logging tool includes a housing that includes a first testing section defining a first central opening having a first diameter and a second testing section defining a second central opening having a second diameter different from the first diameter, a first flow sensor positioned within the first central opening, a second flow sensor positioned within the second central opening, and a sealing device configured to seal an annulus of a wellbore. The second central opening is fluidly coupled to the first central opening.

17 Claims, 2 Drawing Sheets

(56) References Cited

U.S. PATENT DOCUMENTS

| | | | |
|---|---|---|---|
| 5,293,905 | A | 3/1994 | Friedrich |
| 5,586,027 | A | 12/1996 | Carlson et al. |
| 5,661,237 | A | 8/1997 | Dussan et al. |
| 5,831,177 | A | 11/1998 | Waid et al. |
| 6,119,777 | A | 9/2000 | Runia |
| 6,176,315 | B1 | 1/2001 | Reddy et al. |
| 6,263,729 | B1 | 7/2001 | Catala |
| 6,747,270 | B2 | 6/2004 | Pereira et al. |
| 6,776,054 | B1 | 8/2004 | Stephenson et al. |
| 6,910,388 | B2 * | 6/2005 | Jones ............... G01F 1/44 73/861.63 |
| 7,707,897 | B2 * | 5/2010 | Ong ................ G01F 1/36 73/861.04 |
| 7,806,182 | B2 | 10/2010 | Waters et al. |
| 7,933,018 | B2 | 4/2011 | Vannuffelen et al. |
| 8,309,498 | B2 | 11/2012 | Funkhouser et al. |
| 8,342,238 | B2 * | 1/2013 | McCoy ............ E21B 43/128 166/105 |
| 8,450,252 | B2 | 5/2013 | Funkhouser et al. |
| 8,573,302 | B2 | 11/2013 | Robb et al. |
| 8,943,900 | B2 * | 2/2015 | Rezgui .............. G01L 9/04 73/861.42 |
| 8,973,433 | B2 * | 3/2015 | Mulford ............ E21B 47/06 73/152.29 |
| 9,034,802 | B2 | 5/2015 | Ahrenst et al. |
| 9,500,073 | B2 * | 11/2016 | Xiao ................ E21B 43/128 |
| 9,581,475 | B2 * | 2/2017 | Johnson ............. G01F 1/74 |
| 9,611,416 | B2 | 4/2017 | Wang et al. |
| 9,982,519 | B2 * | 5/2018 | Melo ............... G01F 1/44 |
| 2004/0182172 | A1 | 9/2004 | Richards |
| 2005/0039919 | A1 | 2/2005 | Harris et al. |
| 2006/0234871 | A1 | 10/2006 | Dalrymple et al. |
| 2010/0048430 | A1 | 2/2010 | Funkhouser et al. |
| 2012/0006551 | A1 | 1/2012 | Carman et al. |
| 2013/0025867 | A1 | 1/2013 | Sun et al. |
| 2013/0081459 | A1 | 4/2013 | Memiche |
| 2013/0118740 | A1 | 5/2013 | Sherman et al. |
| 2016/0376494 | A1 | 12/2016 | Li et al. |
| 2019/0062619 | A1 | 2/2019 | Li et al. |

OTHER PUBLICATIONS

Gaillard et al., "Novel Associative Acrylamide-based Polymers for Proppant Transport in Hydraulic Fracturing Fluids," SPE International Symposium on Oilfield Chemistry, Society of Petroleum Engineers, SPE 164072, Apr. 8-10, 2013, 11 pages.

Gupta and Carman, "Fracturing Fluid for Extreme Temperature Conditions is Just as Easy as the Rest," SPE Hydraulic Fracturing Technology Conference, Society of Petroleum Engineers, SPE 140176-MS, Jan. 24-26, 2011, 5 pages.

PCT International Search Report and Written Opinion in International Appln. No. PCT/US2021/044646, dated Nov. 30, 2021, 14 pages.

\* cited by examiner

PRODUCTION LOGGING TOOL

TECHNICAL FIELD

This disclosure relates to apparatus, systems, and method for measuring production logging in wellbores, and, more particularly, production logging from both low and high contribution zones along a wellbore.

BACKGROUND

Production logging is often conducted in oil and gas exploration operations in order to assess the flow rate and other characteristics of the fluid flowing into a wellbore from the surrounding subterranean formation. Typically, production logging is performed using downhole production logging tools that include one or more sensors positioned to measure one or more characteristics of the formation fluid flowing into the wellbore from a surrounding subterranean formation connected to the wellbore via perforation clusters. However, certain types of formations generate low fluid contribution and low total flow rates, such as subterranean formations with individual perforation clusters along horizontal wells and/or in low permeability formations. The limited flow contribution and low rates produced by certain formations, especially at the toe section, makes accurately measuring flow rates challenging.

SUMMARY

In an example implementation, a production logging tool includes a housing that includes a first testing section defining a first central opening having a first diameter and a second testing section defining a second central opening having a second diameter different from the first diameter, a first flow sensor positioned within the first central opening, a second flow sensor positioned within the second central opening, and a sealing device configured to seal an annulus of a wellbore. The second central opening is fluidly coupled to the first central opening.

This, and other implementations, can include one or more of the following features. The second diameter can be smaller than the first diameter. The first diameter and the second diameter can be smaller than a diameter of a portion of the wellbore proximate the production logging tool. The production logging tool can include a third testing section defining a third central opening with a third diameter different from the first diameter and the second diameter, and a third flow sensor positioned within the third central opening. The third central opening can be fluidly coupled to the second central opening. The third diameter can be smaller than the first diameter and the second diameter, and the first testing section, the second testing section, and the third testing section can be connected in series and configured to allow formation fluid to flow through the first central opening, the second central opening, and the third central opening in series. The sealing device can include an annular sealing device coupled to the housing. The production logging tool can include a guider device coupled to the housing proximate the first testing section. The guider device can include an outer sealing edge, and a funnel-shaped body. A portion of the funnel-shaped body opposite the outer sealing edge can be fluidly coupled to the first testing section. The sealing device can include the outer sealing edge of the guider device. The first flow sensor can include a first spinner flow sensor; and the second flow sensor can include a second spinner flow sensor. The housing can include a coupling section configured to couple with other logging tools or directly to a downhole conveyance. The first flow sensor and the second flow sensor can generate data for determining an average holdup of formation fluid flowing through the production logging tool.

In some implementations, a production logging method includes positioning a production logging tool in a wellbore, sealing an annulus of the wellbore proximate the production logging tool using a sealing device, measuring a first flow rate of formation fluid flowing through a first testing section of the production logging tool using a first sensor positioned in a first central opening defined by the first testing section, and measuring a second flow rate of formation fluid flowing through a second testing section of the production logging tool using a second sensor positioned in a second central opening defined by the second testing section. The first central opening is fluidly coupled to the second central opening and a diameter of the second central opening is smaller than a diameter of the first central opening This, and other implementations, can include one or more of the following features. The method can include measuring a third flow rate of formation fluid flowing through a third testing section of the production logging tool using a third sensor positioned in a third central opening defined by the third testing section. The third central opening can be fluidly coupled to the second central opening and a diameter of the third central opening can be smaller than the diameter of the second central opening. Sealing the portion of the annulus of the wellbore proximate the production logging tool using a sealing device can include activating a sealing device coupled to a housing of the production logging tool. Sealing the portion of the annulus of the wellbore proximate the production logging tool using a sealing device can include activating a guider device of the production logging tool, and the guider device can be fluidly coupled to the first central opening of the first testing section and include an outer sealing edge. The method can include determining, based on the first flow rate measured by the first sensor and the second flow rate measured by the second sensor, a total flow rate of the formation fluid. The method can include applying an algorithm to the first flow rate measured by the first sensor and the second flow rate measured by the second sensor to maximize accuracy. The method can include determining an average holdup of fluid flowing through the production logging tool.

In some implementations, a downhole tool includes a downhole conveyance, a housing configured to couple with the downhole conveyance, a first flow sensor, a second flow sensor, and a sealing device configured to seal an annulus of a wellbore. The housing includes a first testing section defining a first central opening having a first diameter, and a second testing section defining a second central opening having a second diameter different from the first diameter. The second central opening is fluidly coupled to the first central opening. The first flow sensor is positioned within the first central opening and the second flow sensor is positioned within the second central opening.

Example embodiments of the present disclosure may include one, some, or all of the following features. For example, a production logging tool according to the present disclosure may improve total flow rate measurements by providing testing sections with reduced diameter flow paths to increase the velocity of fluid flowing through the production logging tool. Further, a production logging tool according to the present disclosure may improve the accuracy of formation fluid characteristic measurements, such as flow velocity measurements, by positioning multiple sensors within the production logging tool to measure the respective characteristics of the formation fluid at various flow velocities, as generated by differing inner diameters of one or more testing sections, and using an algorithm to minimize the error among all of the sensors, which can improve the overall accuracy of the measurements. A production logging tool according to the present disclosure may allow for improved flow rate measurements for portions of a wellbore with low total flow rate, such as toe sections of horizontal wellbores. For example, the formation fluid can be flowed through the housing of the tool where the cross-sectional flow area is reduce (e.g., by funneling the flow using two or more testing sections with varying inner diameters) which increases the velocity of the flow through the housing of the production logging tool above a threshold velocity, which can result in more accurate flow rate measurements. Similarly, a production logging tool according to the present disclosure may allow for improved accuracy in estimating contributions of a single perforation cluster by increasing the velocity of the formation fluid flowing from the perforation cluster through the housing of the production logging tool above a threshold velocity using two or more testing sections with varying inner diameters. Further, a production logging tool according to the present disclosure may allow for improved accuracy in determining perforation cluster efficiency within a wellbore.

In addition, a production logging tool according to the present disclosure may reduce the risk of damage to sensors used for measuring characteristics of the formation fluid by positioning the sensors within the production logging tool, for example within a core section of the tool. Further, by positioning the sensors within the core section of the production logging tool, a production logging tool according to the present disclosure may increase the accuracy of the sensor measurements by reducing the exposure of the sensors to debris, scaling, and organic matter within the wellbore, which can cause blinding of sensors.

The details of one or more embodiments of the disclosure are set forth in the accompanying drawings and the description below. Other features, objects, and advantages of the disclosure will be apparent from the description and drawings, and from the claims.

DETAILED DESCRIPTION

The present disclosure describes a production logging tool and system for measuring one or more characteristics of formation fluid in a wellbore.

Figure 1:
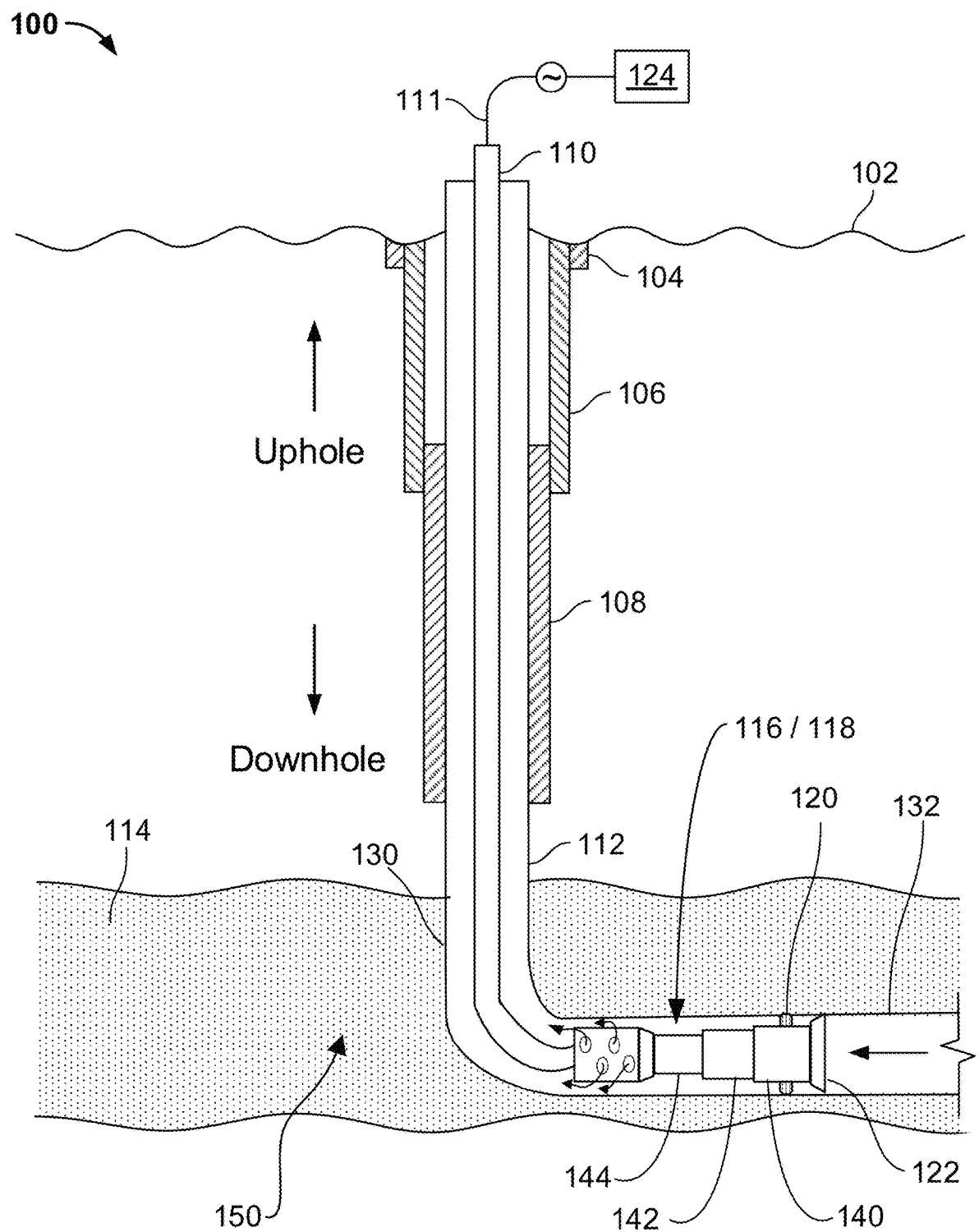
FIG. 1 is a schematic illustration of a wellbore system that includes an example implementation of a production logging tool according to the present disclosure.

FIG. 1 is a schematic illustration of an example wellbore system 100 including a production logging tool 116. The production logging tool 116 can be a multiple flow areas production logging tool. As illustrated in FIG. 1, an implementation of the wellbore system 100 includes a downhole conveyance 110 that is operable to convey (for example, run in, or pull out, or both) the production logging tool 116 through a wellbore 112.

Although not shown, a drilling assembly deployed on the terranean surface 102 may form the wellbore 112 prior to running the production logging tool 116 into the wellbore 112 to a particular location in the subterranean zone 114. The wellbore 112 may be formed to extend from the terranean surface 102 through one or more geological formations in the Earth. One or more subterranean formations, such as subterranean zone 114, are located under the terranean surface 102. One or more wellbore casings, such as surface casing 106 and intermediate casing 108, may be installed in at least a portion of the wellbore 112.

Although shown as a wellbore 112 that extends from land, the wellbore 112 may be formed under a body of water rather than the terranean surface 102. For instance, in some embodiments, the terranean surface 102 may be a surface under an ocean, gulf, sea, or any other body of water under which hydrocarbon-bearing, or water-bearing, formations may be found. In short, reference to the terranean surface 102 includes both land and underwater surfaces and contemplates forming or developing (or both) one or more wellbores 112 from either or both locations.

Generally, the wellbore 112 may be formed by any appropriate assembly or drilling rig used to form wellbores or boreholes in the Earth. A drilling assembly may use traditional techniques to form such wellbores or may use nontraditional or novel techniques. In some embodiments, a drilling assembly may use rotary drilling equipment to form the wellbore 112. As depicted in FIG. 1, the wellbore 112 can include a vertical wellbore section 130 and a horizontal wellbore section 132. In alternative aspects, the wellbore 112 may be directional, vertical, horizontal, curved, multilateral, or other forms.

In some aspects, the downhole conveyance 110 may be a tubular work string made up of multiple tubing joints. For example, a tubular work string typically consists of sections of steel pipe, which are threaded so that they can interlock together. In alternative embodiments, the downhole conveyance 110 may be a wireline. In some examples, the downhole conveyance 110 may be an e-line. In some implementations, the downhole conveyance 110 may be coiled tubing.

Once the wellbore 112 is formed (or in some cases during portions of forming the wellbore 112), one or more tubular casings may be installed in the wellbore 112. As illustrated, the wellbore 112 includes a conductor casing 104, which extends from the terranean surface 102 shortly into the Earth. A portion of the wellbore 112 enclosed by the conductor casing 104 may be a large diameter borehole.

Downhole of the conductor casing 104 may be the surface casing 106. The surface casing 106 may enclose a slightly smaller borehole and protect the wellbore 112 from intrusion of, for example, freshwater aquifers located near the terranean surface 102. The wellbore 112 may then extend vertically downward and/or horizontally outward. This portion of the wellbore 112 may be enclosed by the intermediate casing 108. In some aspects, the location in the wellbore 112 at which the production logging tool 116 is moved to may be an open hole portion (for example, with no casing present) of the wellbore 112.

As shown in the implementation of FIG. 1, the production logging tool 116 includes a housing 118, an annular sealing device 120, and a funnel guider 122. As depicted in FIG. 1, the housing 118 of the production logging tool 116 can be coupled (for example, threadingly or through another connection) to the downhole conveyance 110.

The housing 118 of the production logging tool 116 defines a central opening that extends the length of the production logging tool 116 and is configured to receive formation fluids 150 from the subterranean formation 114. As will described in further detail herein, the housing 118 can include a series of testing sections 140, 142, 144 that each define a central opening with a respective diameter that differs from the diameter of the other testing sections In some aspects, as described in more detail herein, the production logging tool 116 includes one or more sensors configured to measure one or more characteristics of the formation fluid 150 flowing from the subterranean formation 114, into the wellbore 112, and through the production logging tool 116. In some implementations, the one or more sensors are coupled to the housing 118 of the production logging tool 116 inside a central opening the housing 118. For example, the production logging tool can include one or more rotational spinners positioned within the housing 118 and configured to measure the velocity of the formation fluid 150 flowing through the housing 118. In some implementations, each testing section 140, 142, 144 of the production logging tool 116 includes one or more sensors for measuring formation fluid characteristics.

As illustrated in FIG. 1, the production logging tool 116 is communicably coupled through a control line 111 to a controller 124, which, in this example, is located at the terranean surface 102. The control system 124 may be a microprocessor-based, mechanical, or electromechanical controller, as some examples. The controller 124, in some aspects, may send and receive data between it and the production logging tool 116, as well as, for example, provide electrical power to the production logging tool 116. The controller 124 may perform one or more operations described in the present disclosure to operate all or parts of the production logging tool 116. In some implementations, the controller 124 is a computer-readable medium (for example, a non-transitory computer-readable medium) storing instructions executable by one or more processors to perform operations described in this disclosure. In some implementations, the controller 124 includes firmware, software, hardware, processing circuitry or combinations of them that can perform operations described in this disclosure.

As depicted in FIG. 1, in some implementations, the production logging tool 116 includes an annular sealing device 120 positioned on the outside of the housing 118 of the production logging tool 116. As will be described in further detail herein, the annular sealing device 120 can be used to temporarily isolate the annulus of the wellbore 112 downstream of and proximate to an opening of the production logging tool 116 in order to force formation fluid 150 in the wellbore 112 to flow through the production logging tool 116.

In some implementations, as illustrated in FIG. 1, the production logging tool 116 includes a funnel guider 122. As will be described in further detail herein, the funnel guider 122 can be used to direct the flow of formation fluid 150 into the wellbore 112 through the production logging tool 116. In addition, in some implementations, the funnel guider 122 can be used to temporarily isolate the annulus of the wellbore 112 downstream of and proximate to an opening of the production logging tool 116 in order to force the flow of formation fluid 150 into the wellbore 112 through the production logging tool 116.

Figure 2:
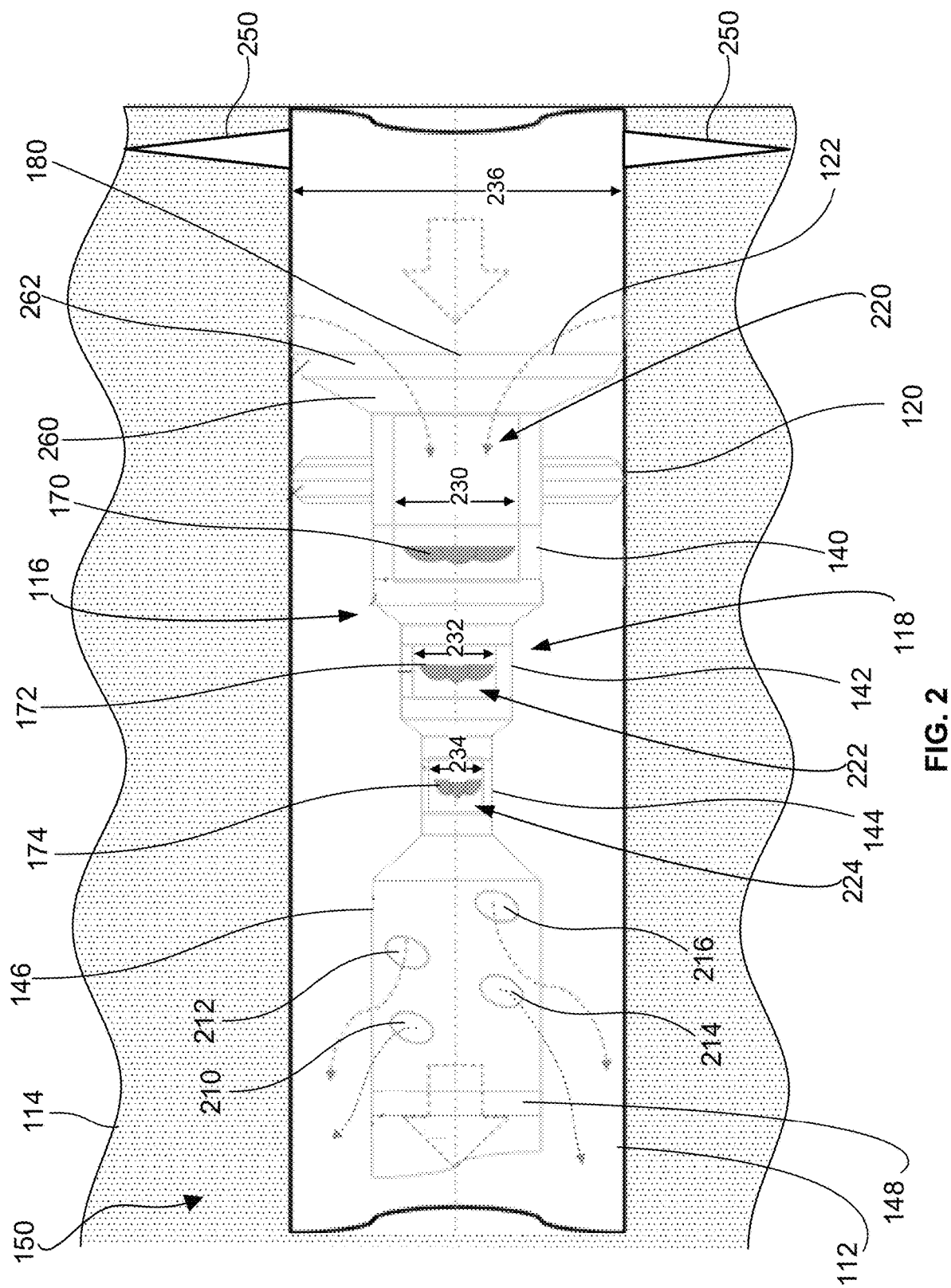
FIG. 2 is a section view of an example implementation of a production logging tool according to the present disclosure.

FIG. 2 is a schematic cross-sectional view of the production logging tool 116 positioned within a horizontal wellbore 112.

As previously discussed, and as can be seen in FIG. 2, the production logging tool 116 includes a housing 118, and an annular sealing device 120 positioned on the outside of the housing 118, and a funnel guider 122 coupled to the housing 118. As will described in detail herein, the production logging tool 116 can be positioned within a wellbore 112 to measure one or more characteristics of formation fluid 150 flowing into the wellbore 112 proximate the production logging tool 116. As depicted in FIG. 2, the housing 118 of the production logging tool 116 includes one or more testing sections 140, 142, 144 and a coupling section 146.

The coupling section 146 is configured to be coupled to a downhole conveyance (e.g., downhole conveyance 110 of FIG. 1) for movement and placement of the production logging tool 116 within the wellbore 112. As can be seen in FIG. 2, in some implementations, the coupling section 146 includes one or more openings 210, 212, 214, 216 to divert the formation fluid 150 passing through the production logging tool 116 to exit the housing 118 of the tool 116. After exiting the production logging tool 116 through the opening 210, 212, 214, 216 in the coupling section 146, the formation fluid 150 can be produced to the surface 102. In some implementation, the coupling section 146 includes a connector 148 for connecting the production logging tool 116 to a downhole conveyance (for example, downhole conveyance 110 of FIG. 1). In some implementations, the connector 148 is configured to couple to coiled tubing. In some implementations, the connector 148 is a bottom hole assembly (BHA) connector configured to couple to a wireline. In some implementations, the connector 148 is configured to couple to other downhole tools (for example, CCL-GR, DHP, DHT, density, holdup, etc.) before connecting to a downhole conveyance either by wireline or coiled tubing (for example, downhole conveyance 110 of FIG. 1).

As depicted in FIG. 2, each of the testing sections 140, 142, 144 defines a central opening 220, 222, 224 extending along the length of the respective testing section 140, 142, 144, and each of the central openings 220, 222, 224 of the testing sections 140, 142, 144 have a different respective diameter 230, 232, 234. For example, as can be seen in FIG. 2, the first testing section 140 forms a central opening 220 along it length having a first diameter 230, which is larger than the diameter 232 of the central opening 222 extending through the second testing section 142. Further, the diameter 232 of the central opening 222 extending through the second testing section 142 is larger than the diameter 234 of the central opening 224 extending through the third testing section 144.

As can be seen in FIG. 2, the diameters 230, 232, 234 of the central openings 220, 222, 224 through each of the testing sections 140, 142, 144 are each smaller than the diameter 236 of the portion of the wellbore 112 proximate the production logging tool 116. As a result, as formation fluid 150 in the wellbore 112 flows into the production logging tool 116 and through each of the testing sections 140, 142, 144, the flow velocity of the formation fluid 150 will increase compared to the flow velocity of the formation fluid 150 in the wellbore 112 due to the reduction in diameter of the flow path through the testing sections 140, 142, 144. This increase in flow velocity resulting from the reduced flow path diameters 230, 232, 234 created by the testing sections 140, 142, 144 can help improve accuracy of flow rate measurements of the formation fluid 150, particularly in areas in which the total flow rate is typically low, such as at the toe section of a horizontal well.

As depicted in FIG. 2, the testing sections 140, 142, 144 each house one or more sensors 170, 172, 174 for measuring characteristics of the formation fluids 150 flowing through the production logging tool 116. For example, as depicted in FIG. 2, each testing section 140, 142, 144 includes a spinner sensor 170, 172, 174 that is configured to measure the flow velocity of formation fluid 150 flowing through the respective testing section 140, 142, 144. For example, as formation fluid 150 flows through each testing section 140, 142, 144 of the production logging tool 116, the spinner sensor 170, 172, 174 of the respective testing section 140, 142, 144 will rotate to measure the velocity of formation fluid 150 as it flows through the respective testing section 140, 142, 144. Any suitable spinner sensors can be used in the testing sections 140, 142, 144 to measure fluid flow velocity.

In some implementations, the internal diameter 230, 232, 234 of each section and the sensitivity levels of the sensors 170, 172, 174 are selected based on the expected flow velocity of fluids in low permeability formations to ensure that the flow velocity of fluid flowing through the tool 116 is above a threshold velocity in least one of the testing sections 140, 142, 144, and therefore at least one of the sensors 170, 172, 174 provides an accurate reading in each wellbore location. For example, when measuring the flow rate in the toe section of a horizontal well (for which a particularly low flow velocity is expected), the measurements captured by sensor 174 in testing section 144 with the smallest internal diameter 234 may be primarily or exclusively relied on to provide accurate flow rate measurements. In contrast, in other wellbore sections with higher expected flow rates, such as the middle portion or heel of a lateral wellbore, the spinners 170, 172 in the testing sections 140, 142 with larger internal diameters 230, 232 can also be relied upon to provide accurate flow rate measurements. In some implementations, the sensor(s) 170, 172, 174 selected for each testing section 140, 142, 144 can include sensors with a detection sensitivity threshold that is within the expected velocity range of the respective testing section 140, 142, 144.

In some implementations, the sensors 170, 172, 174 are communicably coupled to a control system (for example, control system 124 of FIG. 1). In some implementations, data related to the properties of the formation fluid 150 flowing through the production logging tool 116 can be transmitted from the sensors 170, 172, 174 to a control system located outside the wellbore 112 for further analysis.

As depicted in FIG. 2, in some implementations, the sensors 170, 172, 174 are contained within a central opening defined by one of the testing sections 140, 142, 144 of the production logging tool 116. By positioning the sensors in the central opening through the housing 118 of the production logging tool 116, as depicted in FIG. 2, rather than on the exterior of the housing 118, the exposure of the sensors 170, 172, 174 to debris or scaling in the wellbore is minimized. As a result, the probability that the sensors 170, 172, 174 could become blinded, for example by source rock or high concentrations of organic material within the wellbore 112, is reduced.

In some implementations, the production logging tool 116 can be positioned proximate an individual perforation cluster 250 in a horizontal wellbore 112, as depicted in FIG. 2, and can be used to measure various characteristics of the formation fluid 150 being produced by the individual perforation cluster 250 into the wellbore 112. As the total flow produced by an individual perforation cluster 250 is typically low compared to other sections of the wellbore 112, traditional logging tools may be ineffective in accurately measuring the characteristics of the contribution from the individual perforation cluster 250. However, by flowing the formation fluid 150 produced by the individual perforation cluster 250 through the narrowing central openings 220, 222, 224 of the testing sections 140, 142, 144 of the production logging tool 116, the flow velocity of the formation fluid 150 is increased, allowing for the sensors 170, 172, 174 within the testing sections 140, 142, 144 to more accurately measure the total flow, multiphase flow, and other characteristics of the formation fluid being contributed by the individual perforation cluster 250.

In addition, as previously discussed and as depicted in FIG. 2, each of the testing sections includes a central opening 220, 222, 224, and the central openings 220, 222, 224 of the testing sections 140, 142, 144 each have different respective diameter 230, 232, 234. As a result, due to the narrowing of the diameters 230, 232, 234 of the testing sections 140, 142, 144 along the flow path through the production logging tool 116, the flow velocity of the formation fluid 150 increases as it moves through each testing section 140, 142, 144. As a result, the formation fluid characteristics, such as flow rate and average holdup, are measured at a different fluid flow velocity in each testing section 140, 142, 144 due to the difference in diameters 230, 232, 234 of the testing sections 140, 142, 144. By measuring the same characteristics at multiple different flow velocities, the flow characteristics of the formation fluid 150 proximate the production logging tool 116 can be more accurately measured and predicted.

As depicted in FIG. 2, the connections between each of the testing sections 140, 142, 144 of the production logging tool 116 are tapered or angled to allow for a gradual transition between the different diameters 230, 232, 234 of central openings 220, 222, 224 of each of the testing sections 140, 142, 144. By gradually transitioning the reduction in diameter between each testing section 140, 142, 144, turbulence in the flow of formation fluid 150 along the production logging tool 116 can be minimized, which can improve the accuracy of the measurements generated by the sensors 170, 172, 174 of the production logging tool 116. In addition, the length of each testing section 140, 142, 144 can be configured to minimize turbulence along the production logging tool 116.

In some implementations, the diameters 230, 232, 234 of the central openings 220, 222, 224 of the testing sections 140, 142, 144 of the production logging tool 116 are sized based on the expected flow rate for the subterranean formation 114 proximate the portion of the wellbore 112 within which the production logging tool 116 will be deployed. For example, the inner diameters 230, 232, 234 of the testing sections 140, 142, 144 can be selected to accommodate the various formation fluid flow rates present in a horizontal wellbore 112 extending from a toe section of the wellbore 112 to a heel section of the wellbore 112. In some implementations, each of the testing sections 140, 142, 144 has a central opening 220, 222, 224 with a diameter 230, 232, 234 above a minimum threshold in order to prevent excessive pressure differentials between testing sections 140, 142, 144, which could cause in a chocking effect within the production logging tool 116.

Still referring to FIG. 2, in some implementations, the production logging tool 116 includes an annular sealing device 120. As previously discussed, the annular sealing device 120 can be used to temporarily isolate the annulus of the wellbore 112 downstream of and proximate to an opening of the production logging tool 116 in order to force the flow of formation fluid 150 into the wellbore 112 through the production logging tool 116.

In some implementations, the annular sealing device 120 is formed of an elastomeric material and has a diameter that is slightly larger than the diameter 236 of the wellbore 112. In such implementations, as the production logging tool 116 is moved through the wellbore 112, the elastomers forming the annular sealing device 120 press against wellbore 112 (or against a casing within the wellbore 112) and deform slightly to fit within the wellbore 112. The pressure of the annular sealing device 120 against the wellbore 112 (or against a casing in the wellbore 112) serves seal the wellbore 112 proximate a downhole opening 180 of the production logging tool 116. In some implementation, the annular sealing device 120 includes a lubrication mechanism that lubricates the surface of the annular sealing device 120 in contact with the wellbore 112 (or casing) and reduces the drag force or friction created by the annular sealing device 120 as the production logging tool 116 is moved through the wellbore 112.

In some implementations, the annular sealing device 120 is configured to have a first, compressed configuration and a second, expanded configuration. For example, when positioning the production logging tool 116 within the wellbore 112, the annular sealing device 120 can be positioned in a compressed configuration such that an outer diameter of the annular sealing device 120 is smaller than the diameter 236 of the wellbore 112. Once the production logging tool 116 is properly positioned within the wellbore 112, the annular sealing device 120 can be activated to an expanded configuration to temporarily seal the wellbore 112 proximate the downhole opening 180 of the production logging tool 116. For example, once the production logging tool 116 is positioned within the wellbore 112, a setting tool or sleeve can be used to activate the annular sealing device 120 into an expanded configuration such that the annular sealing device 120 expands to contact and press against the wellbore 112. In some implementations, the annular sealing device 120 is formed of elastomeric material and the outer diameter of the annular sealing device 120 in the expanded configuration is slightly larger than the diameter 236 of the wellbore 112. As a result, when expanded, the elastomers forming the annular sealing device 120 press against wellbore 112 (or casing within the wellbore 112) and deform slightly to form a seal against the wellbore 112.

As depicted in FIG. 2, in some implementations, the production logging tool 116 also includes a funnel guider 122. The funnel guider 122 can be used to temporarily seal the wellbore 112 proximate the downhole opening 180 of the production logging tool 116, as well as physically channel formation fluid 150 from the wellbore 112 into the production logging tool 116. The funnel guider 122 includes a funnel-shaped body section 260 and an outer sealing edge 262.

As can be seen in FIG. 2, the outer sealing edge 262 of the funnel guider 122 is configured to press against the wellbore 122 to temporarily seal the wellbore 112 proximate the downhole opening 180 of the production logging tool 116. In some implementations, the outer sealing edge 262 of the funnel guider 122 is formed of an elastomeric material and has a diameter that is slightly larger than the diameter 236 of the wellbore 112. In such implementations, as the production logging tool 116 is moved through the wellbore 112, the elastomers forming the outer sealing edge 262 of the funnel guider 122 press against wellbore 112 (or casing within the wellbore 112) and deform slightly to fit within the wellbore 112. The pressure of the outer sealing edge 262 of the funnel guider 122 against the wellbore 112 (or the casing in the wellbore 112) serves to seal the wellbore 112 proximate the downhole opening 180 of the production logging tool 116. In some implementation, the outer sealing edge 262 of the funnel guider 122 includes a lubrication mechanism that lubricates the surface of the outer sealing device 262 in order to reduce the drag force or friction created by the outer sealing device 262 as the production logging tool 116 is moved through the wellbore 112.

In some implementations, outer sealing edge 262 of the funnel guider 122 is configured to have a first, compressed configuration and a second, expanded configuration. For example, when positioning the production logging tool 116 within the wellbore 112, the funnel guider 122 can be positioned in a compressed configuration such that an outer diameter of the outer sealing edge 262 is smaller than the diameter 236 of the wellbore 112. Once the production logging tool 116 is properly positioned within the wellbore 112, the funnel guider 122 can be expanded to an expanded configuration to temporarily seal the wellbore 112 proximate the downhole opening 180 of the production logging tool 116. For example, once the production logging tool 116 is positioned within the wellbore 112, a setting tool or sleeve can be used to activate the funnel guider 122 into an expanded configuration such that the outer sealing edge 262 contacts and seals the wellbore 112. In some implementations, the outer sealing edge 262 of the funnel guider 122 is formed of elastomeric material and the outer diameter of the outer sealing edge 262 in the expanded configuration is slightly larger than the diameter 236 of the wellbore 112. As a result, when expanded, the elastomers forming the outer sealing edge 262 of the funnel guider 122 press against wellbore 112 (or against the casing within the wellbore 112) and deform slightly to form a seal against the wellbore 112.

As depicted in FIG. 2, the outer sealing edge 262 is connected to and forms the outer edge of the funnel body 260. The funnel body 260 is coupled to the first testing section 140 at an end opposite the outer sealing edge 262, and is configured to channel fluid from the wellbore 112 into the first testing section 140 of the production logging tool 116. As can be seen in FIG. 2, the funnel body 260 has a narrowing diameter along the length of the funnel body 260 from the outer sealing edge 262 to the first testing section 140. As a result of the funnel shape of the funnel body 260, the flow velocity of the formation fluid 150 passing through the funnel guider 122 is gradually increased as it flows towards the testing sections 140, 142, 144 of the production logging tool 116. This gradual increase in flow velocity of the formation fluid 150 generated by the tapered funnel body 260 of the funnel guider 122 helps reduce turbulence in the flow of formation fluid 150 as it passes into the first testing section 140 of production logging tool 116.

An example operation of the production logging tool 116 is described with reference to FIGS. 1 and 2.

The production logging tool 116 is positioned in a wellbore 112 proximate a subterranean formation 114. In some implementations, positioning the production logging tool 116 includes positioning the production logging tool 116 to a target depth. In some implementations, a gamma ray casing collar locator (GR-CCL) may be used to position the production logging tool 116 within the wellbore 112. In some implementations, a depth counter is used to position the production logging tool 116 at the particular depth within the wellbore 112. In some implementations, the production logging tool 116 is positioned using coiled tubing. In some implementations, the production logging tool 116 is positioned using a wireline.

In some implementations, positioning the production logging tool 116 includes positioning the production logging tool 116 along a portion of a horizontal wellbore. For example, in some implementations, positioning the production logging tool 116 includes positioning the production logging tool 116 proximate a particular perforation cluster, such as perforation cluster 250 depicted in FIG. 2.

After positioning the production logging tool 116 within the wellbore 112, an annular sealing device 120 and/or a funnel guider 122 are used to temporarily seal the wellbore 112 proximate to and downstream of the downhole opening of the 180 of the production logging tool 116. For example, in some implementations, a sleeve or setting tool is used to expand and activate the annular sealing device 120 such that the outer surface of annular sealing device 120 presses against the wellbore 112 to form a temporary seal with the wellbore 112 and force fluid into the housing 118 of the production logging tool 116. In some implementations, a sleeve or setting tool is used to expand and activate an outer sealing edge 262 of the funnel guider 122 such that the outer sealing edge 262 presses against the wellbore 112 to form a temporary seal with the wellbore 112 and force fluid into the housing 118 of the production logging tool 116. In some implementations, the annular sealing device 120 and/or the outer sealing edge 262 of the funnel guider 122 are formed of an elastomeric material and have a diameter that is greater than the diameter 236 of the wellbore 112. As a result, as the production logging tool 116 is positioned along the wellbore 112 the elastomers forming the annular sealing device 120 and/or the outer sealing edge 262 of the funnel guider 122 press against wellbore 112 (or against a casing within the wellbore 112) and deform slightly to fit within the wellbore 112, thus creating a seal against the wellbore 112 proximate the downhole opening 180 of the production logging tool 116.

Once the wellbore 112 is sealed proximate to and downstream of the downhole opening of the 180 of the production logging tool 116, formation fluid 150 flowing into the wellbore 112 from the surrounding formation 114 (for example, from a particular perforation cluster 250) is forced through the downhole opening 180 of the production logging tool 116 and into the testing sections 140, 142, 144 of the production logging tool 116. For example, as formation fluid 150 flows into the wellbore 112 from the surrounding formation 114, and in particular from the perforation cluster 250, pressure builds in the wellbore 112 upstream of the seal formed by the annular sealing device 120 and/or the outer sealing edge 262 of the funnel guider 122. As the pressure builds in the wellbore 112, formation fluid 150 begins to flow into the production logging tool 116 through the downstream opening 180.

In addition, the funnel guider 122 of the production logging tool 116 helps channel formation fluid 150 into the housing 118 of the production logging tool 116. For example, as previously discussed and as depicted in FIG. 2, the funnel guider 122 includes a funnel-shaped body 260 that is coupled to the first testing section 140 and is configured to channel fluid from the wellbore 112 into the first testing section 140 of the production logging tool 116. As a result of the funnel shape of the funnel body 260, the flow velocity of the formation fluid 150 passing through the funnel guider 122 is gradually increased as it flows towards the testing sections 140, 142, 144 of the production logging tool 116. This gradual increase in flow velocity of the formation fluid 150 generated by the tapered funnel body 260 of the funnel guider 122 helps reduce turbulence in the flow of formation fluid 150 as it passes into the first testing section 140 of production logging tool 116.

As the formation fluid 150 flows through the central opening 220 of the first testing section 140, the sensor(s) 170 within the first testing section 140 measures one or more characteristics of the formation fluid 150. For example, as depicted in FIG. 2, the first testing section 140 of the production logging tool 116 includes a spinner sensor 170 positioned along the central opening 220 of the first testing section 140. As formation fluid 150 flows through the first testing section 140, the spinner sensor 170 rotates to measure the flow velocity of the formation fluid 150 as it flows through the central opening 220 of the first testing section 140.

The formation fluid 150 exits the first testing section 140 and enters the second testing section 142. As the formation fluid 150 flows through the central opening 222 of the second testing section 142, the sensor(s) 172 within the second testing section 142 measure one or more characteristics of the formation fluid 150. For example, as depicted in FIG. 2, the second testing section 142 of the production logging tool 116 includes a spinner sensor 172 positioned along the central opening 222 of the second testing section 142. As formation fluid 150 flows through the second testing section 142, the spinner sensor 172 rotates to measure the flow velocity of the formation fluid 150 as it flows through the central opening 222 of the second testing section 142.

After flowing through the second testing section 142, the formation fluid 150 exits the second testing section 142 and enters the third testing section 144. As the formation fluid 150 flows through the central opening 224 of the third testing section 144, the sensor(s) 174 within the third testing section 144 measure one or more characteristics of the formation fluid 150. For example, as depicted in FIG. 2, the third testing section 144 of the production logging tool 116 includes a spinner sensor 174 positioned along the central opening 224 of the third testing section 144. As formation fluid 150 flows through the third testing section 144, the spinner sensor 174 rotates to measure the flow velocity of the formation fluid 150 as it flows through the central opening 224 of the third testing section 144.

As can be seen in FIG. 2, each of the central openings 220, 222, 224 of the testing sections 140, 142, 144 have different respective diameters 230, 232, 234. For example, as can be seen in FIG. 2, the first testing section 140 forms a central opening 220 along it length having a first diameter 230, which is larger than the diameter 232 of the central opening 222 through the second testing section 142, and the diameter 232 of the central opening 222 through the second testing section 142 is larger than the diameter 234 of the central opening 224 through the third testing section 144. In addition, the diameter 230, 232, 234 of the central openings 220, 222, 224 through each of the testing sections 140, 142, 144 are each smaller than the diameter 236 of the wellbore 112 that the production logging tool 116 is positioned within. As a result, as formation fluid 150 in the wellbore 112 flows into the production logging tool 116 and through each of the testing sections 140, 142, 144, the flow rate of the formation fluid 150 increases compared to the flow rate of formation fluid 150 in the wellbore 112 due to the reduction in diameter of the flow path created through the testing sections 140, 142, 144.

In addition, as the formation fluid 150 flows from the first testing section 140 into the second testing section 142, the flow velocity of the formation fluid 150 will increase due to the narrower diameter 232 of the central opening 222 of the second testing section 142 compared to the central opening 220 of the first testing section 140. Further, as the flow velocity of the formation fluid 150 will further increase when flowing from the second testing section 142 to the third testing section 144 due to the narrower diameter 234 of the central opening 232 of the third testing section 144 compared to the central opening 222 of the second testing section 142. This increase in flow velocity resulting from the reduced flow path diameters created by the testing sections 140, 142, 144 of the production logging tool 116 can help improve accuracy of flow velocity measurements of the formation fluid, particularly in areas in which the total flow is typically low, such as at the toe section of a horizontal well. In addition, as will be described in further detail below, by measuring the flow velocity of the formation fluid 150 in multiple testing sections 140, 142, 144 having different inner diameters 230, 232, 234, the total flow rate and multiphase components of the formation fluid can be more accurately determined.

As depicted in FIG. 2, the connections between each of the testing sections 140, 142, 144 are angled or tapered to allow for a gradual transition between the different diameters 230, 232, 234 of central openings 220, 222, 224 of each of the testing sections 140, 142, 144 and thus prevent turbulence as the formation fluid 150 flows between each of the testing sections 140, 142, 144.

Once the formation fluid 150 has exited the third testing section 144, the formation fluid flows through a coupling section 146 of the production logging tool 116. As can be seen in FIG. 2, in some implementations, the coupling section 146 includes one or more openings 210, 212, 214, 216 to divert the formation fluid 150 passing through the production logging tool 116 out of the housing 118 of the production logging tool 116. After exiting the production logging tool 116 through the openings 210, 212, 214, 216 in the coupling section 146, the formation fluid 150 can be produced to the surface 102.

The sensors 170, 172, 174 in the testing sections 140, 142, 144 of the production logging tool can transmit the data measured by the respective sensors 170, 172, 174 for further analysis to determine one or more characteristics of the formation fluid, such as total flow rate, multiphase flow rate, average holdup, etc. For example, the spinner sensors 1701, 172, 174 can transmit data to a control system (for example, control system 124 of FIG. 1) for further analysis.

For example, the spinner sensor 170 in the first testing section 140 can transmit data related to the velocity of the formation fluid 150 produced by the perforation cluster 250 as it flows through the first testing section 140 to the control system 124. Based on the data received from the spinner sensor 170 in the first testing section 140 and the diameter 230 of the central opening 220 of the first testing section 140, the control system 124 can determine the flow rate and total contribution of the individual perforation cluster 250 proximate the production logging tool 116. For example, the relationship between the total flow rate (Q) of the formation fluid 150, the velocity (v) of the formation fluid 150 as measured by the spinner sensor 170 of the first testing section 140, and the radius (r, which can be determined based on the diameter 230) of the central opening 220 of the first testing section 140 is provided by Equation 1.

$$v = \frac{Q}{\pi r^2}$$

Using Equation 1, the total flow rate of the formation fluid 150 being produced by the performation cluster 250 can be determined.

Similarly, the spinner sensors 172, 174 in the second testing section 142 and third testing section 144 can transmit data related to the velocity of the formation fluid 150 produced by the perforation cluster 250 as it flows through the second testing section 142 and third testing section 144, respectively, to the control system 124. The control system 124 can utilize Equation 1 above to calculate the total of the formation fluid 150 being produced by the perforation cluster 250 based on the velocity (v) of the formation fluid 150 as measured by the spinner sensor 172 of the second testing section 142, and the radius (r, which can be determined based on the diameter 232) of the central opening 222 of the second testing section 142. In addition, the control system 124 can utilize Equation 1 above to calculate the total of the formation fluid 150 being produced by the perforation cluster 250 based on the velocity (v) of the formation fluid 150 as measured by the spinner sensor 174 of the third testing section 144, and the radius (r, which can be determined based on the diameter 234) of the central opening 224 of the third testing section 144.

In some implementations, based on the total flow rate determined based on the measurements generated by the spinner sensor 170, 172, 174 and the central opening 220, 222, 224 diameters 230, 232, 234, as well as based on sensor measurements used to determine of average holdup and quantify each phase of the formation fluid 150 (such as formation fluid resistivity, density, optical methods, etc.), the multiphase components of the formation fluid 150 produced by the individual perforation cluster 250 proximate the production logging tool 116 can be determined by the control system 124. Average holdup and multiphase flow can be calculated based on the total flow rate determined based on the spinner sensor 170, 172 174 measurements using standard calculation methodologies. In addition, in some implementations, based on the data received from the spinner sensors 170, 172, 174 and additional data indicating the average holdup of the phases of formation fluid 150, the flow rate of each phase of the formation fluid 150 can be determined by the control system 124.

As previously discussed, due to the different diameters 230, 232, 234 of each of central openings 220, 222, 224 of the testing sections 140, 142, 144, the flow velocity of the formation fluid 150 changes as it moves from one testing section 140, 142, 144 to another. As a result, the formation fluid characteristics, such as flow rate and average holdup, are measured at a different fluid flow velocity in each testing section 140, 142, 144 due to the difference in diameters 230, 232, 234 of the testing sections 140, 142, 144. By measuring the same characteristics at multiple different flow velocities, the flow characteristics for the formation fluid 150 proximate the production logging tool 116 can be more accurately measured and predicted.

For example, in some implementations, the control system 124 applies an algorithm that reduces or minimizes the error among all of the measurements generated by the sensors 170, 172, 174, which can improve the overall accuracy of the measurements. By minimizing error and improving overall measurement accuracy, the production logging tool 116 can be utilized to accurately determine cluster and perforation contribution, fracturing cluster efficiency in unconventional reservoirs, and any other flow quantification applications to optimize of stimulation parameters.

While certain embodiments have been described above, other embodiments are possible.

For example, while each testing section 140, 142, 144 of the production logging tool 116 has been described as having a single sensor 170, 172, 174, in some implementations, the testing sections 140, 142, 144 each include two or more sensors. In addition, while FIG. 2 depicts each testing section 140, 142, 144 as having a spinner sensor 170, 172, 174, one or more other types of sensors may be included in the testing sections 140, 142, 144. For example, each testing section 170, 172, 174 can include one or more ultrasonic sensors, pulsed neutron sensors, optical sensors, density sensors, pressure sensors, temperature sensors, conductivity sensors, and/or casing collar locator (CCL) sensors. In some implementations, each testing section 140, 142, 144 of the production logging tool 116 includes the same type and/or number of sensors. In some implementations, the testing sections 140, 142, 144 include different types and/or different numbers of sensors. In some implementations, each testing section 140, 142, 144 includes one or more sensors for measuring flow velocity and one or more sensors for measuring average holdup.

Further, while the production logging tool 116 has been described as including three testing sections 140, 142, 144, other numbers of testing sections 140, 142, 144 with varying diameters may be used. For example, in some implementations, the production logging tool can include two testing sections, each with a central opening of a different diameter. In some implementations, the production logging tool includes four or more testing sections, each with a central opening of a different diameter.

In addition, while the production logging tool 116 has been described as including both an annular sealing device 120 and a funnel guider 122, either an annular sealing device 120 alone or a funnel guider 122 alone can be used to temporarily isolate the annulus of the wellbore 112 proximate the production logging tool 116 and force formation fluid 150 through the production logging tool 116.

While the production logging tool 116 is depicted in FIGS. 1 and 2 as being positioned within a horizontal wellbore 112, the production logging tool 116 can be utilized to measure formation fluid characteristics in other types of wells, including vertical wells.

In addition, while the production logging tool 116 has been described as being positioned such that the formation fluid flows downstream through the production logging tool 116, in some implementations the production logging tool 116 may be used to perform logging against the flow direction in the wellbore 112. For example, a sealing device could be positioned within the wellbore 112 downstream of the production logging tool 116 and configured to seal the annulus of the wellbore 112 downstream of the production logging tool 116. As pressure increases in the wellbore 112 downstream of the production logging tool 116 as a result of the seal, formation fluid 150 will be forced to flow upstream through the production logging tool 116. In some implementations, flow rate measurements can be performed using the production logging tool 116 while running the tool 116 in the wellbore 112 (i.e., against flow of the wellbore), when the tool 116 is stationary within the wellbore 112, and/or when the production logging tool 116 is being pulled out of the wellbore (i.e., in the same direction as flow in the wellbore).

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A production logging tool comprising:
a housing configured to be disposed within a wellbore, the housing having an uphole end and a downhole end, the uphole end closer to the surface compared to the downhole end, the housing comprising:
a first testing section, wherein the first testing section defines a first central opening having a first diameter; and
a second testing section between the first testing section and the uphole end of the housing, wherein the second testing section defines a second central opening having a second diameter smaller than the first diameter, wherein the second central opening is fluidly coupled to the first central opening;
a third testing section between the second testing section and the uphole end of the housing, wherein the third testing section defines a third central opening with a third diameter smaller than the first diameter and the second diameter, wherein the third central opening is fluidly coupled to the second central opening;
a first flow sensor positioned within the first central opening;
a second flow sensor positioned within the second central opening;
a third flow sensor positioned within the third central opening; and
a sealing device configured to seal an annulus of the wellbore, the sealing device disposed closer to the downhole end than the uphole end.

2. The production logging tool of claim 1, wherein the first diameter and the second diameter are smaller than a diameter of a portion of the wellbore proximate the production logging tool.

3. The production logging tool of claim 1, wherein:
the third diameter is smaller than the first diameter and the second diameter; and
the first testing section, the second testing section, and the third testing section are connected in series and configured to allow formation fluid to flow through the first central opening, the second central opening, and the third central opening in series.

4. The production logging tool of claim 1, wherein the sealing device comprises an annular sealing device coupled to the housing.

5. The production logging tool of claim 1, further comprising a guider device coupled to the downhole end of the housing proximate the first testing section.

6. The production logging tool of claim 5, where the guider device comprises:
- an outer sealing edge attached to the downhole end of the housing, the outer sealing edge configured to seal the annulus of the wellbore; and
- a funnel-shaped body, wherein a portion of the funnel-shaped body opposite the outer sealing edge is fluidly coupled to the first testing section.

7. The production logging tool of claim 6, wherein the sealing device comprises the outer sealing edge of the guider device.

8. The production logging tool of claim 1, wherein:
- the first flow sensor comprises a first spinner flow sensor; and
- the second flow sensor comprises a second spinner flow sensor.

9. The production logging tool of claim 1, wherein the housing further comprises a coupling section configured to couple with other logging tools or directly to a downhole conveyance.

10. The production logging tool of claim 1, wherein the first flow sensor and the second flow sensor generate data for determining an average holdup of formation fluid flowing through the production logging tool.

11. A production logging method comprising:
- positioning a production logging tool in a wellbore;
- sealing an annulus of the wellbore proximate the production logging tool using a sealing device;
- measuring a first flow rate of formation fluid flowing in an uphole direction toward a surface of the wellbore through a first testing section of the production logging tool using a first sensor positioned in a first central opening defined by the first testing section;
- measuring a second flow rate of formation fluid flowing through a second testing section of the production logging tool positioned downstream of the first testing section using a second sensor positioned in a second central opening defined by the second testing section, wherein the first central opening is fluidly coupled to the second central opening and a diameter of the second central opening is smaller than a diameter of the first central opening; and
- measuring a third flow rate of formation fluid flowing through a third testing section of the production logging tool positioned downstream of the second testing section using a third sensor positioned in a third central opening defined by the third testing section, wherein the third central opening is fluidly coupled to the second central opening and a diameter of the third central opening is smaller than the diameter of the second central opening.

12. The method of claim 11, wherein sealing the portion of the annulus of the wellbore proximate the production logging tool using a sealing device comprises activating a sealing device coupled to a housing of the production logging tool.

13. The method of claim 11, wherein sealing the portion of the annulus of the wellbore proximate the production logging tool using a sealing device comprises activating an a guider device of the production logging tool, wherein the guider device is fluidly coupled to the first central opening of the first testing section and comprises an outer sealing edge.

14. The method of claim 11, further comprising determining, based on the first flow rate measured by the first sensor and the second flow rate measured by the second sensor, a total flow rate of the formation fluid.

15. The method of claim 11, further comprising applying an algorithm to the first flow rate measured by the first sensor and the second flow rate measured by the second sensor to maximize accuracy.

16. The method of claim 11, further comprising determining, an average holdup of fluid flowing through the production logging tool.

17. A downhole tool comprising:
- a downhole conveyance;
- a housing configured to couple with the downhole conveyance, the housing configured to be disposed within a wellbore, the housing having an uphole end and a downhole end, the uphole end closer to the surface compared to the downhole end, the housing comprising:
- a first testing section, wherein the first testing section defines a first central opening having a first diameter; and
- a second testing section between the first testing section and the uphole end of the housing, wherein the second testing section defines a second central opening having a second diameter smaller than the first diameter, wherein the second central opening is fluidly coupled to the first central opening;
- a third testing section between the second testing section and the uphole end of the housing, wherein the third testing section defines a third central opening with a third diameter smaller than the first diameter and the second diameter, wherein the third central opening is fluidly coupled to the second central opening;
- a first flow sensor positioned within the first central opening;
- a second flow sensor positioned within the second central opening;
- a third flow sensor positioned within the third central opening; and
- a sealing device configured to seal an annulus of the wellbore, the sealing device disposed closer to the downhole end than the uphole end.

* * * * *